(12) United States Patent
Busch et al.

(10) Patent No.: US 7,033,677 B2
(45) Date of Patent: Apr. 25, 2006

(54) LASER-MARKABLE LAMINATE

(75) Inventors: Detlef Busch, Saarlouis (DE); Matthias Roth, Zweibrücken (DE)

(73) Assignee: Trespaphan GmbH, Neunkirchen (DE)

( * ) Notice: Subject to any disclaimer, the term of this patent is extended or adjusted under 35 U.S.C. 154(b) by 247 days.

(21) Appl. No.: 10/467,873

(22) PCT Filed: Feb. 25, 2002

(86) PCT No.: PCT/EP02/01947

§ 371 (c)(1),
(2), (4) Date: Aug. 8, 2003

(87) PCT Pub. No.: WO02/068192

PCT Pub. Date: Sep. 6, 2002

(65) Prior Publication Data

US 2004/0071994 A1 Apr. 15, 2004

(30) Foreign Application Priority Data

Feb. 26, 2001 (DE) .................................... 101 09 253

(51) Int. Cl.
*B32B 27/08* (2006.01)
*B32B 5/22* (2006.01)
*B41M 5/40* (2006.01)

(52) U.S. Cl. .................. 428/515; 428/516; 428/317.9; 428/32.5; 428/32.52

(58) Field of Classification Search ................ 428/515, 428/516, 32.5, 32.52, 317.9
See application file for complete search history.

(56) References Cited

U.S. PATENT DOCUMENTS

| 5,746,866 | A | * | 5/1998 | Tanaka et al. ............... 156/234 |
| 5,935,902 | A | * | 8/1999 | Imamura ..................... 503/227 |
| 6,284,425 | B1 | * | 9/2001 | Staral et al. ................. 430/201 |
| 6,458,504 | B1 | * | 10/2002 | Wachi et al. ................ 430/200 |
| 2004/0033427 | A1 | * | 2/2004 | Coveleski et al. ............ 430/30 |
| 2004/0071994 | A1 | * | 4/2004 | Busch et al. ................. 428/480 |

FOREIGN PATENT DOCUMENTS

| DE | 196 30 478 A1 | 1/1998 |
| DE | 199 05 415 A1 | 8/2000 |
| WO | WO 00/12305 A1 | 3/2000 |

OTHER PUBLICATIONS

Carl Hanser Verlag: "Laserbeschriften Nun Auch Bei Polyolefinen Moeglich" Kunststoffe, Munchen, Germany, vol. 79, (Nov. 1, 1989) p. 1138.

* cited by examiner

*Primary Examiner*—Geraldine Letscher
(74) *Attorney, Agent, or Firm*—ProPat, L.L.C.

(57) ABSTRACT

The invention relates to a laminate consisting of a multilayer transparent film and a multilayer opaque film, which has an intermediate layer. The base layer of the transparent film contains a pigment, which absorbs illumination in the wavelength range of a laser. The laminate can be marked and inscribed using a laser.

39 Claims, No Drawings

LASER-MARKABLE LAMINATE

The invention relates to a laminate comprising a transparent and opaque polyolefin film. The laminate can be marked with a laser beam, with the laser beam producing a high-contrast, readily recognizable mark.

BACKGROUND OF THE INVENTION

In the prior art, processes for marking polymeric materials are known. Materials of this type comprise a radiation-sensitive additive which causes a color change in the material on exposure to radiation in certain wavelength ranges. These additives are known as laser pigments.

The prior art also discloses polyolefin films which are biaxially oriented for certain applications and generally have a thickness in the range from 3 to 100 μm. It is known to modify biaxially oriented films by means of suitable additives. Additives of this type can improve the friction, the antistatic properties, the thermal stability, the appearance or other film properties. However, these additives must not have an excessively adverse effect on other important service properties.

The object of the present invention was to provide a laser-markable polyolefin film. In particular, the film should be markable with laser light by means of suitable processes. The laser mask should have good contrast, and should preferably appear as a dark mark. During marking, holes through the film must not be produced by the laser beam. At the same time, the film should have a good appearance and good service properties.

BRIEF DESCRIPTION OF THE INVENTION

This object is achieved by a laminate built up from two thermoplastic films A and B, where the transparent film A is a transparent, multilayered oriented polyolefin film comprising a base layer and at least one top layer, and the base layer comprises an additive which absorbs laser light in a wavelength range from 300 to 10,000 nm, and film B is an oriented, opaque, multilayered polyolefin film which is built up from a base layer and at least one interlayer applied to this base layer and at least one top layer applied to the interlayer, where the opaque film comprises vacuole-initiating fillers in its base layer and additionally $TiO_2$ in the base layer and/or interlayer, where the interlayer contains essentially no vacuoles.

DETAILED DESCRIPTION OF THE INVENTION

For the purposes of the present invention, laminate means a multilayered film structure produced from two separately produced films by a further processing step (lamination), where the laminated films are themselves multilayered, coextruded, biaxially oriented films.

The structure and composition of the transparent film A is described in greater detail below. Film A is a multilayered, coextruded, biaxially oriented film.

The base layer of the transparent film A generally comprises at least 85% by weight, preferably from 90 to <100% by weight, in particular from 98 to <100% by weight, in each case based on the layer, of a polyolefin. Polyolefins are, for example, polyethylenes, polypropylenes, polybutylenes or copolymers of olefins having from two to eight carbon atoms, of which polyethylenes and polypropylenes are preferred. The precise content of polymer in the base layer depends on the amounts of laser pigment and any further additives additionally present in the base layer.

In general the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight respectively generally consists, if present, of ethylene and butylene. The data in % by weight are in each case based on the propylene polymer.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The -heptane-soluble content of the polymer is generally from 1 to 10% by weight, preferably 2–5% by weight, based on the starting polymer. The molecular weight distribution of the propylene polymer can vary.

The ratio between the weight average molecular weight $M_w$ and the number average molecular weight $M_n$ is generally between 1 and 15, preferably from 2 to 10, very particularly preferably from 2 to 6. Such a narrow molecular weight distribution of the propylene homopolymer is achieved, for example, by peroxidic degradation thereof or by preparation of the polypropylene using suitable metallocene catalysts.

In a further embodiment of the invention, the polypropylene employed in the base layer is highly isotactic. For highly isotactic polypropylene of this type, the chain isotacticity index, determined by $^{13}$C-NMR spectroscopy, of the -heptane-insoluble content of the polypropylene is at least 95%, preferably from 96 to 99%.

It is essential to the invention that the base layer of the transparent film A comprises an additive which absorbs laser light in a wavelength range from 200 to 10,000 nm, preferably in a range from 300 to 2000 nm (referred to as "laser pigment" below). Particular preference is given to laser pigments which absorb the radiation of an Nd-YAG laser (1064 nm or 532 nm). The base layer of the transparent film A generally comprises the laser pigment in an amount of from 0.1 to 3% by weight, preferably from 0.2 to 1.5% by weight, in particular from 0.3 to 1% by weight, based on the weight of the base layer. If the content exceeds 3% by weight in the base layer, the optical properties of the film are adversely affected. The film exhibits a metallic luster or intefering fogging, which is undesired for most applications. In addition, it has been found, surprisingly, that concentrations greater than 3% by weight of laser pigment do not further improve the markability of the laminate. Excessively low concentrations of less than 0.1% by weight do not result in satisfactory marking. The mark itself and the contrast is weak and exhibits flaws at the usual marking speeds, and a line drawn with the laser no longer appears as a line.

Particularly suitable laser pigments are, for example, silicates, in particular phyllosilicates, such as mica, of which muscovite, biotite, phlogopite, vermiculite and synthetic micas are particularly preferred. The mean particle size of the laser pigments is generally in a range from 1 to 15 μm, preferably from 1 to 10 μm. The maximum particle size should not exceed 25 μm, preferably 20 μm, in particular 15 μm (so-called cut-off). In a preferred embodiment, the laser pigments have a coating or addition of metal oxides. Preferred metal oxides for the addition or coating are SbO, SnO and/or TiO2. Modified laser pigments of this type per se and processes for their preparation are disclosed in the prior art. For example, pigments of this type and their use in plastics in general are described in DE 195 25 960, which is expressly incorporated herein by way of reference.

In a further embodiment, the laser pigments are incorporated into a polymer matrix in relatively large amounts and then employed as so-called masterbatch for production of the film. Matrix polymers for such concentrates or masterbatches can be polyethylene or polypropylenes, which should generally be compatible with the base polymer of the film. The concentration of laser pigment in the concentrates is generally in a range from 10 to 30% by weight, preferably from 15 to 25% by weight, based on the concentrate.

In addition to the laser pigments which are essential to the invention, the base layer of the transparent film A may comprise conventional additives, such as neutralizers, stabilizers, antistatics and/or lubricants, in effective amounts in each case. The base layer of the transparent film A preferably comprises a combination of lubricants, such as, for example, fatty acid amide, and antistatics, such as, for example, tertiary aliphatic amines, as well as neutralizers and stabilizers.

Preferred antistatics are alkali metal alkanesulphonates, polyether-modified, i.e. ethoxylated and/or propoxylated, polydiorganosiloxanes (polydialkylsiloxanes, polyalkylphenylsiloxanes and the like) and/or essentially straight-chain and saturated aliphatic tertiary amines containing an aliphatic radical having from 10 to 20 carbon atoms which are substituted by alpha-hydroxy-($C_1$–$C_4$)alkyl groups, where N,N-bis(2-hydroxyethyl)alkylamines having from 10 to 20 carbon atoms, preferably from 12 to 18 carbon atoms, in the alkyl radical are particularly suitable. The effective amount of antistatic is in the range from 0.05 to 0.5% by weight.

Lubricants are higher aliphatic acid amides, higher aliphatic acid esters, waxes and metal soaps, as well as polydimethylsiloxanes. The effective amount of lubricant is in the range from 0.01 to 3% by weight, preferably from 0.02 to 1% by weight. The addition of higher aliphatic acid amides in the range from 0.01 to 0.25% by weight in the layer is particularly suitable. A particularly suitable aliphatic acid amide is erucamide. The addition of polydimethylsiloxanes is preferred in the range from 0.02 to 2.0% by weight, in particular polydimethylsiloxanes having a viscosity of from 5000 to 1,000,000 $mm^2$/s.

Stabilizers which can be employed are the conventional stabilizing compounds for polymers of ethylene, propylene and other olefins. Their added amount is between 0.05 and 2% by weight. Particularly suitable are phenolic stabilizers, alkali metal/alkaline earth metal stearates and/or alkali metal/alkaline earth metal carbonates. Phenolic stabilizers are preferred in an amount of from 0.1 to 0.6% by weight, in particular from 0.15 to 0.3% by weight, and with a molecular weight of greater than 500 g/mol. Pentaerythrityl tetrakis-3-(3,5-di-tert-butyl-4-hydroxyphenyl)propionate and 1,3,5-trimethyl-2,4,6-tris(3,5-di-tert-butyl-4-hydroxybenzyl)benzene are particularly advantageous.

Neutralizers are preferably dihydrotalcite, calcium stearate and/or calcium carbonate having a mean particle size of at most 0.7 μm, an absolute particle size of less than 10 μm and a specific surface area of at least 40 $m^2$/g. Neutralizers are usually employed in an amount of from 0.01 to 0.1% by weight.

The data in % by weight are in each case based on the weight of the base layer.

The transparent polyelefin film A comprises at least one top layer, in a preferred embodiment top layer(s) on both sides, of polymers of olefins having from 2 to 10 carbon atoms, which is (are) generally applied to the laser pigment-containing base layer. The top layer(s) generally comprise(s) from 95 to 100% by weight of polyolefin, preferably from 98 to <100% by weight of polyolefin, in each case based on the weight of the top layer(s).

Examples of suitable olefinic polymers of the top layer(s) are propylene homopolymers, copolymers or terpolymers of ethylene, propylene and/or butylene units or mixtures of the said polymers. Of these, preferred polymers are propylene homopoylmer, as described above for the base layer, or random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, or random ethylene-propylene-1-butylene terpolymers having an ethylene content of from 1 to 10% by weight and a 1-butylene content of from 2 to 20% by weight, or a mixture or blend of ethylene-propylene-1-butylene terpolymers and propylene-1-butylene copolymers having an ethylene content of from 0.1 to 7% by weight and a propylene content of from 50 to 90% by weight and a 1-butylene content of from 10 to 40% by weight.

The data in % by weight are in each case based on the weight of the polymer. The above-described copolymers and/or terpolymers employed in the top layer(s) generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the above-mentioned melt flow indices are measured at 230° C. and a force of 21.6 N (DIN 53 735). If desired, all the above-described top-layer polymers may have been peroxidically degraded, with the degradation factor generally being in the range from 1 to 15, preferably from 1 to 8.

If desired, the additives described above for the base layer, such as antistatics, neutralizers, lubricants and/or stabilizers, and, if desired, additionally antiblocking agents, can be added to the top layer(s). The data in % by weight are then based correspondingly on the weight of the top layer.

Suitable antiblocking agents are inorganic additives, such as silicon dioxide, calcium carbonate, magnesium silicate, aluminium silicate, calcium phosphate and the like, and/or incompatible organic polymers, such as polyamides, polyesters, polycarbonates and the like, preference being given to benzoguanamine-formaldehyde polymers, silicon dioxide and calcium carbonate. The effective amount of antiblocking agent is in the range from 0.1 to 2% by weight, preferably from 0.1 to 0.8% by weight. The mean particle size is between 1 and 6 μm, in particular 2 and 5 μm.

In a preferred embodiment, the surface of one top layer of the transparent film is subjected to a process for increasing the surface tension. Suitable processes are corona, flame or plasma treatment. During production of the laminate according to the invention from a transparent film A treated on one side, the surface-treated side of the transparent film A is preferably laminated against film B.

The thickness of the top layer(s) is greater than 0.1 μm and is preferably in the range from 0.1 to 5 μm, in particular from 0.5 to 3 μm, where top layers on both sides may have identical or different thicknesses. The total thickness of the polyolefin film A can vary and is preferably from 4 to 60 μm, in particular from 5 to 50 μm, preferably from 10 to 35 μm, where the base layer makes up from about 40 to 98% of the total film thickness.

In a further embodiment, film A can additionally have transparent interlayers of the polyolefins described above for the top layers and the base layer on one or both sides.

The structure and composition of the opaque film B is described in greater detail below. Film B is mutilayered, coextruded, biaxially oriented film.

Film B of the laminate according to the invention is an oriented, opaque, multilayered polyolefin film built up from a base layer and at least one interlayer and at least one top layer, where the opaque film comprises vacuole-initiating fillers in its base layer and additionally TiO2 in the base layer and/or interlayer. However, the interlayer of film B contains essentially no vacuoles.

The base layer of the opaque film generally comprises at least 80% by weight, preferably from 85 to 99% by weight, in particular from 98 to 90% by weight, in each case based on the layer, of a polyolefin. Polyolefins are, for example, polyethylenes, polypropylenes, polybutylenes or copolymers of olefins having from two to eight carbon atoms, amongst which polyethylenes and polypropylenes are preferred. The precise content of polymer in the base layer depends on the amounts of fillers and any additives additionally present.

In general, the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight respectively generally consists, if present, of ethylene and butylene. The data in % by weight are in each case based on the propylene polymer.

Preference is given to isotactic propylene homopoylmers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymers is generally from 1 to 10% by weight, preferably 2–5% by weight, based on the starting polymer. The molecular weight distribution of the propylene polymer can vary. The ratio between the weight average molecular weight $M_w$ and the number average molecular weight $M_n$ is generally between 1 and 15, preferably from 2 to 10, very particularly preferably from 2 to 6. Such a narrow molecular weight distribution of the propylene homopolymer is achieved, for example, by peroxidic degradation thereof or by preparation of the polypropylene using suitable metallocene catalysts.

In a preferred embodiment of the invention, the polypropylene employed is highly isotactic. For highly isotactic polypropylenes of this type, the chain isotacticity index, determined by $^{13}$C-NMR spectroscopy, of the n-heptane-insoluble content of the polypropylene is at least 95%, preferably from 96 to 99%.

The base layer of the opaque film generally comprises vacuole-initiating fillers in a maximum amount of 20% by weight, preferably from 1 to 15% by weight, in particular from 2 to 10% by weight, based on the weight of the base layer.

"Vacuole-initiating fillers" are solid particles which are incompatible with the polymer matrix and result in the formation of vacuole-like cavities when the films are stretched. In general, the vacuole-initiating fillers have a minimum size of 1 μm, the mean particle diameter of the particles generally being from 1 to 6 μm. Conventional vacuole-initiating fillers are inorganic and/or organic, polypropylene-incompatible materials, such as aluminium oxide, aluminium sulphate, barium sulphate, calcium carbonate, magnesium carbonate, silicates, such as aluminium silicate (kaolin clay) and magnesium silicate (talc), and silicon dioxide, amongst which preference is given to the use of calcium carbonate and silicon dioxide.

Suitable organic fillers are the conventional polymers which are incompatible with the polymer of the base layer, in particular those such as HDPE, copolymers of cyclic olefins, such as norbornene or tetracyclododecene, with ethylene or propene (COC), polyesters, polystryrenes, polyamides and halogenated organic polymers, preference being given to polyesters, such as, for example, polybutylene terephthalates, and cycloolefin copolymers. For the purposes of the present invention, "incompatible materials or incompatible polymers" means that the material or polymer is in the film in the form of a separate particle or separate phase.

In addition to the vacuole-initiating fillers, the base layer of the opaque film optionally comprises pigments, preferably $TiO_2$, generally in a maximum amount of 10% by weight, preferably from 1 to 8% by weight, in particular from 2 to 5% by weight, based on the weight of the base layer.

For the purposes of the present invention, pigments are incompatible particles which essentially do not result in vacuole formation when the film is stretched and generally have a mean particle diameter in the range from 0.01 to a maximum of 1 μm. Conventional pigments are, for example, aluminium oxide, aluminium sulphate, barium sulphate, calcium carbonate, magnesium carbonate, silicates, such as aluminium silicate (kaolin clay) and magneisum silicate (talc), silicon dioxide and titanium dioxide, of which preference is given to the use of white pigments, such as calcium carbonate, silicon dioxide, titanium dioxide and barium sulphate.

If desired, the additives described above for film A, such as antistatics, neutralizers, lubricants and/or stabilizers, can be added to the base layer in a manner known per se in effective amounts in each case, amongst which preference is given to neutralizers and stabilizers and antistatics.

It is essential to the invention that the opaque film comprises, as a laminate constituent, at least one interlayer, which is applied to the surface of the base layer. If desired, a second interlayer may be present on the opposite surface of the base layer. The interlayer(s) can be built up from the olefinic polymers described for the base layer. In general, the interlayer(s) comprise(s) from 80 to 100% by weight, preferably from 90 to <100% by weight, of polyolefin, preference being given amongst the possible polyolefins to the propylene polymers described above for the base layer of film B. The interlayer(s) may comprise the conventional additives described for the individual layers, such as antistatics, neutralizers, lubricants and/or stabilizers. In a further embodiment, the interlayer comprise pigments which are described above for the base layer. $TiO_2$ is also referred as a pigment for the interlayer. In general, the interlayer comprises from 1 to 10% by weight, in particular from 1 to 8% by weight, of pigment, preferably $TiO_2$, in each case based on the weight of the interlayer. The thickness of the interlayer(s) is greater than 0.3 μm and is preferably in the range from 1.0 to 15 μm, in particular from 1.5 to 10 μm.

It is furthermore essential to the invention that the interlayer is essentially free from vacuoles, preferably containing no vacuoles. It has been found that vacuoles in the interlayer have an adverse effect on the laser marking of the laminate. The vacuole-containing interlayer results in a reduction in the contrast of the mark and in impaired resolution of the writing produced by means of a laser beam. The interlayer therefore generally does not comprise any $CaCO_3$ or organic polyesters or other vacuole-initiating particles whose mean particle size is greater than 1 μm and result in the formation of vacuoles during stretching.

It is furthermore essential that the opaque film B comprises, as laminate constituent, at least one top layer which is applied to the surface of the interlayer. If desired, a second top layer may be present on the opposite side, where this second top layer may be applied to the surface of the base layer or to the surface of a second interlayer. The top layer(s) are built up from polymers of olefins having from 2 to 10 carbon atoms and generally comprise from 95 to 100% by weight of polyolefin, preferably from 98 to <100% by weight of polyolefin, in each case based on the weight of the top layer(s).

Examples of suitable olefinic polymers of the top layer(s) of film B are propylene homopolymers, copolymers or terpolymers comprising ethylene, propylene or butylene units or mixtures of the said polymers. Of these, preferred polymers are propylene homopolymers are described above for the base layer, or random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, or random ethylene-propylene-1-butylene terpolymers having an ethylene content of from 1 to 10% by weight and a 1-butylene content of from 2 to 20% by weight, or a mixture or blend of ethylene-propylene-1-butylene terpolymers and propylene-1-butylene copolymers having an ethylene content of from 0.1 to 7% by weight and a propylene content of from 50 to 90% by weight and a 1-butylene content of from 10 to 40% by weight.

The data in % by weight are in each case based on the weight of the polymer. The above-described copolymers and/or terpolymers employed in the top layer generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the melt flow indices indicated above are measured at 230° C. and a force of 21.6 N (DIN 53 735).

If desired, the additives described above for film A, such as antistatics, neutralizers, lubricants and/or stabilizers, and, if desired, additionally antiblocking agents may be added to the top layer(s).

In a preferred embodiment, the surface of the top layer is subjected to a process for increasing the surface tension. Suitable processes are corona, flame or plasma treatment. During production of the laminate from an opaque film B treated on one side, the top layer applied to the interlayer is preferably treated and laminated with this side against the transparent film A.

The thickness of the top layer(s) is greater than 0.1 µm and is preferably in the range from 0.1 to 5 µm, in particular from 0.5 to 3 µm, where top layers on both sides may have identical or different thicknesses. The total thickness of the opaque film B can vary and is preferably from 4 to 100 µm, in particular from 5 to 80 µm, preferably from 20 to 60 µm, where the base layer makes up from about 40 to 90% of the total film thickness.

Films A and B which are processed to give the laminate according to the invention are preferably both biaxially oriented and can be produced by a stenter or blowing process known per se, only the stenter process being suitable for the opaque film.

In the stenter process, the melts corresponding to the individual layers of the film are coextruded through a flat-film die, the resultant film is taken off over one or more roll(s) for solidification, the film is subsequently stretched (oriented), the stretched film is heat-set and, if desired, plasma-corona- or flame-treated on the surface layer intended for the treatment.

Biaxial stretching (orientation) is carried out sequentially or simultaneously. The sequential stretching is generally carried out consecutively, with consecutive biaxial stretching, in which stretching is firstly carried out longitudinally (in the machine direction) and then transversely (perpendicular to the machine direction), being preferred. The film production is described further using the example of flat film extrusion with subsequent sequential stretching.

Here, as is usual in the extrusion process, the polymer or polymer mixture of the individual layers is compressed and liquefied in an extruder, it being possible for the laser pigments, fillers and any other additives added already to be present in the polymer or polymer mixture. The laser pigments and fillers may also be added via a masterbatch.

The melts are then forced simultaneously through a flat-film die (slot die), and the extruded multilayers film is taken off over one or more take-off rolls at a temperature of from 10 to 100° C., preferably from 20 to 50° C., during which it cools and solidifies.

The film obtained in this way is then stretched longitudinally and transversely to the extrusion direction, which results in orientation of the molecule chains. The longitudinal stretching is preferably carried out at a temperature of from 80 to 150° C., advantageously with the aid of two rolls running at different speeds corresponding to the target stretching ratio, and the transverse stretching is preferably carried out at a temperature of from 120 to 170° C. with the aid of an appropriate tenter frame. The longitudinal stretching ratios are in the range from 4 to 8, preferably from 5 to 6. The transverse stretching ratios are in the range from 5 to 10, preferably from 7 to 9.

The stretching of the film is followed by heat-setting (heat treatment) thereof, in which the film is held at a temperature from 100 to 160° C. for from about 0.1 to 10 seconds. The film is subsequently wound up in a conventional manner by means of a wind-up device.

After the biaxial stretching, one or both surface(s) of the film is (are) preferably plasma-, corona-, or flame-treated by one of the known methods. The treatment intensity is generally in the range from 37 to 50 mN/m, preferably from 39 to 45 mN/m.

Films A and B are converted into a laminate in a manner known per se. It is preferred here to laminate the top layers of the films against one another. If films with top layers on both sides are laminated, at least one of the surfaces to be laminated should preferably be surface-treated. A surface treatment improves the adhesion of the two films to one another during conversion into the laminate. It is essential to the invention that the opaque film is laminated with the side having an interlayer against the transparent film. This "interlayer side" forms the inside of the laminate. In the case of an opaque film with interlayers on both sides, i.e. a five-layered film, the side of film B with the higher surface gloss should be used for the lamination.

Surprisingly, it has been found that not only the optical properties, such as whiteness and opacity, of the opaque film contribute to a good appearance of the mark. The gloss of the side to be laminated also plays an important role. In particular, it was surprising that a laminate comprising paper and transparent film A was significantly less suitable for marking. It has been found that not only opacity and whiteness as background for the transparent film make the mark particularly visible. Instead, the interlayer present in the structure of the opaque film makes an essential contribution to the desired results with respect to contrast, resolution and edge sharpness of the mark.

It has been found that a particularly smooth or glossy surface of film B after lamination with this gloss surface significantly improves the markability of the film. Comparable opaque films without interlayers (therefore with lower gloss) exhibit significantly worse contrast of the mark. Filling of the interlayer with vacuole-initiating fillers on the side to be laminated also has adverse effects. This result was particularly surprising since it was originally expected that particularly high opacity and particularly high whiteness would result in a particularly visible mark on the laminate. Why the nature of the surface (the inner surface in the laminate) of the opaque film B to be laminated has any effect at all on the quality of the mark is not completely understood. However, it has been found that the interlayer without vacuoles significantly improves the result.

In a preferred embodiment, the gloss values of the opaque films on the side to be laminated are in a range from 50 to 100, preferably from 60 to 90 in particular from 65 to 85, in accordance with DIN 67530 at a measurement angle of 20°.

The lamination can be carried out by means of processes known per se. Both extrusion lamination and lamination processes with the aid of an adhesive are suitable. Lamination processes of this type are known from the prior art.

Processes for laser marking are also known per se. For this purpose, the film is introduced into the ray path of a laser, preferably an Nd:YAG laser. It goes without saying that the side with the laser pigment-containing film A faces the laser during the marking. The choice of laser depends on the wavelength at which the pigment or film has the highest possible absorption cross section. The hue and color depth of the mark depend on the irradiation time and the energy density of the radiation and can easily be optimized by the person skilled in the art by variation of the said parameters. Absorption cross sections can be determined by specific variation of the wavelengths.

The laser-markable laminate according to the invention is suitable for all applications in which conventional printing and inscription processes can be replaced or supplemented by laser inscription or laser marking. The mark produced is a particularly resistant inscription which is not impaired by moisture, solvents, mechanical load, exposure to sun or UV radiation, manual abrasion or the like, even over an extended period. In particular, inscriptions, codes, symbols or the like with particularly high resolution, which can also be designed so as to be machine-readable, can be applied in this way.

The laminate can be employed either itself for the packaging of consumer goods, it being possible, if desired, for conventional prints, laminations or metallizations to be carried out on the surface of the opaque film B before lamination with the transparent film A, with in general the "inner" surface to be laminated (i.e. the side of the opaque film which has higher gloss values) being printed or metallized. The laminate can also be converted further into secondary products in a manner known per se. In particular, the laminate is sued as a label, it being possible to use a very wide variety of labelling methods. The laminate can be used as an adhesive label, self-adhesive label, in-mould or blow-mould label, it being possible for both decorative and informative marks or inscriptions to be applied by means of a laser.

Furthermore, the laminate can be used for the generation of tactile information. The laser mark leaves not only an optically recognizable mark. In addition, the laser beam also produced an elevation at the point of incidence on the laminate surface, which is smooth per se. This effect can be employed for the production of reading codes for the blind. The raised mechanical mark is particularly abrasion-resistant and durable.

Furthermore, it has been found, surprisingly, that the laminate has particularly well-controllable tearing behaviour along the laser mark. The laminate can thus also particularly advantageously be employed as an easy-opening film. The optical mark indicates to the consumer how the line to be torn runs. It is possible in this way to design packaging in such a way that it does not only tear longitudinally along a straight line. The design of any desired separation and tear lines is possible.

This effect is particularly surprising since OPP films per se have a poor tearing behaviour since it is completely uncontrolled. Although a mechanical weakening of film A along the mark could perhaps be expected, it could not have been derived from this that this effect in film A determines the tearing behaviour of the entire laminate.

The raw materials and films were characterized using the following measurement methods:

Melt Flow Index

The melt flow index was measured in accordance with DIN 53 735 at a load of 21.6 N and 230° C.

Mean Particle Size

The mean particle size was determined by image analysis. For this purpose a sample is dispersed in water in order to separate the particles and applied to a glass slide. The sample is subsequently dried and studied under the scanning electron microscope. For this purpose, the individual particles are made visible as a grey shade image by means of a suitable setting of brightness and contrast. Over an area of 10 mm$^2$, the respective area of the separated particles is measured, and the particle diameter is given as the diameter of a circle of equal area. These measurement values are classified by size ranges and indicate the distribution of the particle size. The mean particle diameter is determined as the mean of the distribution curve.

Opacity and Whiteness

The opacity and whiteness are determined with the aid of the "ELREPHO" electric remission photometer from Zeiss, Oberkochem (DE), standard illuminant C, 2 standard observer. The opacity is determined in accordance with DIN 53 146. The whiteness is defined as W=RY+3RZ−3RX, where W=whiteness; RY, RZ and RX=corresponding reflection factors on use of the Y, Z and X color measurement filters respectively. The white standard used is a barium sulphate compact (DIN 5033, Part 9). A detailed description is described in, for example, Hansl Loos, "Farbmessung" [Color Measurment], Verlag Beruf und Schule, Itzehoe (1989).

Light Transparency

The light transparency is measured in accordance with ASTM-D 1003-77.

Melting Point

DSC measurement, maximum of the melting curve, heating rate 20° C./min.

Haze

The has of the film was measured in accordance with AST-D 1003-52.

Gloss

The gloss was determined in accordance with DIN 67 530. The reflector value was measured as an optical parameter for the surface of a film. In accordance with the standards ASTM-D 523-78 and ISO 2813, the angle of incidence was set at 60°. A light beam hits the planar test surface at the set angle of incidence and is reflected or scattered thereby. The light beams incident on the photoelectronic receiver are displayed as a proportional electrical quantity. The measurement value is dimensionless and must be specified together with the angle of incidence.

Marking Quality

The quality of the mark with respect to resolution, contrast and edge sharpness is assessed visually.

EXAMPLE 1

Production of the Transparent Film A

A transparent three-layered film having a symmetrical structure with a total thickness of 20 μm was produced by coextrusion and subsequent stepwise orientation in the longitudinal and transverse directions. The top layers each had a thickness of 0.7 μm.

Base Layer

μ96.74% by weight of isotactic propylene homopolymer having a melting point of 166° C. and a melt flow index of 3.4 g/10 min 3.00% by weight of a masterbatch comprising 80% by weight of ethylene homopolymer and 20% by weight of the laser pigment, corresponding to a content of 0.6% by weight of laser pigment, based on the layer; the laser pigment was a coated mica whose coating consisted of metal oxides ($SbO$, $SnO$, $TiO_2$).

0.13% by weight of Irganox 1010
0.13% by weight of Armostate

Top Layers

~99.5% by weight of isotactic polypropylene homopolymer having a melting point of 166° C. and a melt flow index of 3.4 g/10 min 0.5% by weight of polydimethysiloxane All layers comprised stabilizers and neutralizers in conventional amounts. The production conditions in the individual process steps were:

| Extrusion: | Temperatures | Base layer: | 260° C. |
|---|---|---|---|
| | | Interlayers: | 255° C. |
| | | Top layers: | 240° C. |
| | Temperature of the take-off roll: | | 20° C. |
| Longitudinal stretching: | Temperature: | | 110° C. |
| | Longitudinal stretching ratio: | | 5.5 |
| Transverse stretching: | Temperature: | | 160° C. |
| | Transverse stretching ratio: | | 9 |
| Setting: | Temperature: | | 150° C. |
| | Convergence: | | 5% |

The film was subsequently corona-pretreated on both sides.

EXAMPLE 2

Production of the Opaque Film B

An opaque four-layered film with a layer structure top layer D1/interlayer Z/base layer B/top layer D2 with a total thickness of 35 μm was produced by coextrusion and subsequent stepwise orientation in the longitudinal and transverse directions. The top layers D1 and D2 each had a thickness of 0.7 μm. The interlayers Z had a thickness of 3 μm. The film was corona-pretreated on the surface of top layer D1.

Base Layer (B)

~90.25% by weight of isotactic propylene homopolymer having a melting point of 166° C. and a melt flow index of 3.4 g/10 min 9.5% by weight of a masterbatch comprising 30% by weight of propylene homopolymer and 45% by weight of $CaCO_3$ and 25% by weight of $TiO_2$, corresponding to a content of 4.3% by weight of $CaCO_3$ and 2.4% by weight of $TiO_2$, based on the layer 0.13% by weight of Armostate
0.12% by weight of Irganox

Interlayer (Z)

99.73% by weight of isotactic propylene homopolymer having a melting point of 166° C. and a melt flow index of 3.4 g/10 min 0.14% by weight of Armostate
0.13% by weight of Irganox

Top Layers (D1)

98.8% by weight of random ethylene-propylene copolymer having an ethylene content of about 4% by weight and a melting point of about 120° C. erucamide 1.2% by weight of $SiO_2$ as antiblocking agent

Top Layer (D2)

98.8% by weight of random ethylene-propylene copolymer having an ethylene content of about 4% by weight and a melting point of about 120° C. erucamide 1.2% by weight of $SiO_2$ as antiblocking agent All layers comprised stabilizers and neutralizers in conventional amounts. The production conditions in the individual process steps were:

The production conditions in the individual process steps were:

| Extrusion: | Temperatures | Base layer: | 260° C. |
|---|---|---|---|
| | | Interlayers: | 255° C. |
| | | Top layers: | 240° C. |
| | Temperature of the take-off roll: | | 20° C. |
| Longitudinal stretching: | Temperature: | | 110° C. |
| | Longitudinal stretching ratio: | | 5.5 |
| Transverse stretching: | Temperature: | | 160° C. |
| | Transverse stretching ratio: | | 9 |
| Setting: | Temperature: | | 150° C. |
| | Convergence: | | 5% |

The film had a surface gloss on the D1 side of 70 at a measurement angle of 20°.

EXAMPLE 3

Lamination and Marking

The transparent film as described in Example 1 and the opaque film as described in Example 2 were laminated by melt extrusion and marked with an Nd-Yag laser, with the gloss side of the opaque film being laminated against the transparent film. (D1 of the opaque film against a top layer of the transparent film)

Comparative Example 1

Lamination Against Paper

The transparent film according to Example 1 was laminated against a paper by means of adhesive and subsequently marked as described in Example 3.

Comparative Example 2

Opaque Film without Interlayer

An opaque film as described in Example 2 was produced, but without the interlayer described. The gloss on both sides of the film was 40. This three-layered opaque film was laminated with a transparent film as described in Example 1 and marked as described in Example 3.

Comparative Example 3

Opaque Film with Vacuoles in the Interlayer

An opaque film as described in Example 2 was produced. However, $CaCO_3$ was added to the interlayer via a masterbatch, so that the interlayer comprised 3% by weight of $CaCO_3$ and had vacuoles. The gloss was now 40 at a measurement angle of 20°. This film was laminated as described in Example 3 with a transparent film according to Example 1 and marked.

Comparative Example 4

Lamination Against the Other Surface

The films according to Example 1 and 2 were laminated as described in Example 3 and subsequently marked. In contrast to Example 3, however, the relatively matt top layer D2 of the opaque film was laminated against the transparent film.

The laminate according to Example 3 according to the invention exhibited a high-contrast, readily recognizable mark which additionally had clear edge sharpness. The mark can be perceived clearly as a dark inscription on the white background of the laminate. All laminates according to the comparative example exhibited a faint mark, which were very much more difficult to perceive visually owing to the lack of contrast and lack of sharpness in the edge region of the mark.

What is claimed is:

1. Laminate which can be marked by means of laser light in a wavelength range from 300 to 10,000 nm comprising at least two thermoplastic films A and B, wherein
    film A is a transparent, multilayered oriented polyolefin film comprising a base layer and at least one top layer, and the base layer comprises an additive which absorbs laser light, and
    film B is an oriented, opaque, multilayered polyolefin film which is made from a base layer and at least one interlayer applied to this base layer and at least one top layer applied to the interlayer, wherein the opaque film comprises vacuole-initiating fillers in its base layer and TiO2 in the base layer top layer, or in the base layer and top layer wherein the interlayer contains essentially no vacuoles.

2. Laminate according to claim 1, wherein the laser-absorbent additive is $SiO_2$.

3. Laminate according to claim 1 wherein the laser-absorbent additive is provided with a coating.

4. Laminate according to claim 1, wherein the laser-absorbent additive is provided with a coating of metal oxides.

5. Laminate according to claim 1, wherein the laser-absorbent additive absorbs a wavelength of from about 300 to about 10,000 nm.

6. Laminate according to claim 1, wherein the laser-absorbing additive is present in the base layer of film A in an amount of from about 1 to about 10% by weight.

7. Laminate according to claim 1, wherein film A has top layers on both sides.

8. Laminate according to claim 1, wherein the top layer of film A has been treated by means of a process for increasing the surface tension, and film A is laminated on this surface-treated side against film B.

9. Laminate according to claim 1, wherein film A comprises antistatics, and a lubricant in its base layer.

10. Laminate according to claim 1, wherein film B comprises vacuole-initiating filters in its base layers in an amount of from about 1 to about 10% by weight, based on the weight of the base layer.

11. Laminate according to claim 1, wherein the vacuole-initiating filler is $CaCO_3$ or polyethylene terephthalate or polybutylene terephthalate.

12. Laminate according to claim 1, wherein $TiO_2$ is present in an amount of from about 1 to about 10% by weight, based on the total weight of the film.

13. Laminate according to claim 1, wherein the $TiO_2$ is present in the interlayer in an amount of from about 1 to about 15% by weight, and the interlayer has a thickness of from about 2 to about 15 µm.

14. Laminate according to claim 1, wherein film B has top layers on both sides, and the thickness of the top layers is between about 0.5 and about 5 µm.

15. Laminate according to claim 1, wherein film B has a second interlayer on the opposite surface of the base layer.

16. Laminate according to claim 15, wherein the thickness of the second interlayer is from about 1 to about 15 µm.

17. Laminate according to claim 1, wherein the second interlayer comprises $TiO_2$.

18. Laminate according to claim 1, wherein at least one top layer has been treated by means of a process for increasing the surface tension, selected from one or more of corona-, plasma- and flame-treatment.

19. Laminate according to claim 1, wherein film B is laminated with its surface-treated side.

20. Laminate according to one claim 1, wherein the two films A and B are joined by means of an adhesive.

21. Laminate according to claim 1, wherein the two films A and B are joined by means of extrusion lamination.

22. Laminate according to claim 1, wherein it has a dark mark produced by means of a laser beam.

23. Process for the laser marking of a laminate according to claim 1, wherein the laminate is marked or inscribed by means of an Nd:YAG laser.

24. Method of making a packaging, which method comprises converting a laminate according to claim 1 into a packaging.

25. Laminate according to claim 1 comprising one or more of a tactile mark, inscription, graphic and other information.

26. Laminate according to claim 25, wherein the mark is depression or raised.

27. Laminate according to claim 25 or 26, wherein the tactile mark, inscription, graphic or other information is applied in a reading code for the blind.

28. Method of making an easy-opening package which method comprises converting a laminate according to claim 1 into an easy-opening packaging.

29. Label comprising a laminate a laminate according to claim 1 or 25.

30. Method of labeling containers with foods, which method comprises applying a label according to claim 29 to a container with foods.

31. Method of making a raised, tactile mark, inscription, graphic or other information on a thermoplastic polymer film, which method comprises the action of a laser.

32. Laminate according to claim 2, wherein the $SiO_2$ is a mica.

33. Laminate according to claim 4, wherein the metal oxide is selected from one or more of SbO, SnO and TiO2.

34. Laminate according to claim 5, wherein the additive absorbs the radiation of an Nd:YAG laser.

35. Laminate according to claim 6, wherein the laser-absorbing additive is present in an amount of from about 2 to about 8% by weight.

36. Laminate according to claim 6, wherein the laser-absorbing additive is present in an amount of from about 2 to about 5% by weight.

37. Laminate according to claim 7, wherein the top layers on both sides are made from propylene copolymers or propylene terpolymers or from ethylene copolymers and ethylene terpolymers.

38. Laminate according to claim 9, wherein the antistatic comprise a tertiary aliphatic amine, and wherein the lubricant comprises an erucamide.

39. Laminate according to claim 17, wherein the $TiO_2$ is present in an amount of from about 1 to about 15% by weight, based on the weight of the interlayer.

* * * * *

UNITED STATES PATENT AND TRADEMARK OFFICE
CERTIFICATE OF CORRECTION

PATENT NO.       : 7,033,677 B2
APPLICATION NO. : 10/467873
DATED            : April 25, 2006
INVENTOR(S)      : Busch et al.

It is certified that error appears in the above-identified patent and that said Letters Patent is hereby corrected as shown below:

Column 13
Line 63, delete "2" insert --$TiO_2$--
Line 63, insert -or- immediately following TiO2 in the base layer Column 15
Line 4, delete "a laminate"

Signed and Sealed this

Twenty-fifth Day of July, 2006

JON W. DUDAS
*Director of the United States Patent and Trademark Office*